(12) United States Patent
Idogaki et al.

(10) Patent No.: US 12,454,332 B2
(45) Date of Patent: Oct. 28, 2025

(54) CONTROL SYSTEM AND CONTROL DEVICE FOR HUMAN-POWERED VEHICLE

(71) Applicant: Shimano Inc., Osaka (JP)

(72) Inventors: Satoshi Idogaki, Osaka (JP); Tadaharu Kurotobi, Osaka (JP); Koji Yuasa, Osaka (JP)

(73) Assignee: Shimano Inc., Osaka (JP)

( * ) Notice: Subject to any disclaimer, the term of this patent is extended or adjusted under 35 U.S.C. 154(b) by 492 days.

(21) Appl. No.: 17/992,062

(22) Filed: Nov. 22, 2022

(65) Prior Publication Data
US 2023/0174193 A1 Jun. 8, 2023

(30) Foreign Application Priority Data
Nov. 25, 2021 (JP) ................................. 2021-191173

(51) Int. Cl.
*B62M 6/50* (2010.01)
(52) U.S. Cl.
CPC ..................................... *B62M 6/50* (2013.01)
(58) Field of Classification Search
CPC .............. B62M 6/50; B62M 6/45; B60D 1/30
USPC ..................................................... 180/206.3
See application file for complete search history.

(56) References Cited

U.S. PATENT DOCUMENTS

| | | | | |
|---|---|---|---|---|
| 5,141,067 A * | 8/1992 | Diggs | ..................... | B62D 59/04 280/204 |
| 5,240,266 A * | 8/1993 | Kelley | ................... | B62K 27/12 280/492 |
| 5,579,228 A * | 11/1996 | Kimbrough | ............... | B60D 1/58 701/41 |
| 5,816,349 A * | 10/1998 | Hankins | .................... | B62M 7/16 280/493 |
| 5,829,771 A * | 11/1998 | Hsu | ....................... | B62K 27/003 280/204 |
| 6,056,306 A * | 5/2000 | Rust | ........................ | B62B 7/008 280/47.38 |
| 6,292,094 B1 * | 9/2001 | Deng | ..................... | B62D 7/159 701/44 |
| 6,481,735 B1 * | 11/2002 | Hilk | ..................... | B62K 27/006 280/503 |
| 6,725,955 B2 * | 4/2004 | Bidwell | ............... | B62K 27/003 280/204 |
| 7,154,385 B2 * | 12/2006 | Lee | ........................ | B62D 6/002 340/684 |

(Continued)

FOREIGN PATENT DOCUMENTS

DE  10 2016 115 803 A1  7/2017
JP  2020-29206 A  2/2020
(Continued)

*Primary Examiner* — Valentin Neacsu
*Assistant Examiner* — Michael R Stabley
(74) *Attorney, Agent, or Firm* — Global IP Counselors LLP

(57) ABSTRACT

A control system is provided for controlling an electrical component of a human-powered vehicle in accordance with a swivel state of a riding portion and a carrier. The control system includes a sensor, an electrical component and an electronic controller. The sensor is configured to output a signal corresponding to a pivot angle of a pivot portion provided between the carrier and the riding portion located between the carrier and a handle. The electronic controller is configured to control the electrical component in accordance with the signal output from the sensor.

20 Claims, 12 Drawing Sheets

(56) References Cited

U.S. PATENT DOCUMENTS

| | | | | |
|---|---|---|---|---|
| 8,056,657 B1* | 11/2011 | Duehring | B62K 27/006 | 280/204 |
| 8,165,770 B2* | 4/2012 | Getman | B60T 8/1755 | 280/445 |
| 8,261,859 B2* | 9/2012 | Duehring | B62M 7/14 | 280/204 |
| 8,297,384 B2* | 10/2012 | Wanger | B62K 27/003 | 180/11 |
| 8,365,849 B2* | 2/2013 | Bartel | B60L 7/10 | 303/146 |
| 9,037,346 B2* | 5/2015 | Keys, II | B62D 59/04 | 701/1 |
| 9,120,359 B2* | 9/2015 | Chiu | B60D 1/30 | |
| 9,981,662 B2* | 5/2018 | Lavoie | B60W 10/06 | |
| 10,259,390 B2* | 4/2019 | Zhang | G06T 7/73 | |
| 10,611,407 B2* | 4/2020 | Lavoie | B62D 13/06 | |
| 11,136,031 B2* | 10/2021 | Rabbiosi | B62D 59/04 | |
| 11,358,678 B2* | 6/2022 | Shahana | B62J 1/165 | |
| 11,623,713 B2* | 4/2023 | Shahana | B62M 6/45 | 180/206.2 |
| 11,642,970 B2* | 5/2023 | Vallier | B60L 15/42 | 701/2 |
| 11,707,975 B2* | 7/2023 | Knoche | H02K 11/0094 | 701/22 |
| 2002/0038730 A1* | 4/2002 | Bidwell | B62M 7/16 | 180/15 |
| 2007/0290476 A1* | 12/2007 | Chuang | B62K 27/12 | 280/204 |
| 2008/0023234 A1* | 1/2008 | Wang | B62M 7/14 | 280/204 |
| 2010/0096197 A1* | 4/2010 | Stoddart | B62M 7/16 | 280/481 |
| 2019/0118670 A1* | 4/2019 | Vallier | B60L 50/50 | |
| 2020/0130778 A1 | 4/2020 | Shahana et al. | | |
| 2020/0377094 A1* | 12/2020 | Rabbiosi | B60L 7/18 | |
| 2021/0188394 A1 | 6/2021 | Shahana et al. | | |

FOREIGN PATENT DOCUMENTS

| | | |
|---|---|---|
| JP | 2020-69888 A | 5/2020 |
| JP | 2020-90242 A | 6/2020 |
| JP | 2021-54370 A | 4/2021 |

* cited by examiner

CONTROL SYSTEM AND CONTROL DEVICE FOR HUMAN-POWERED VEHICLE

CROSS-REFERENCE TO RELATED APPLICATIONS

This application claims priority to Japanese Patent Application No. 2021-191173, filed on Nov. 25, 2021. The entire disclosure of Japanese Patent Application No. 2021-191173 is hereby incorporated herein by reference.

BACKGROUND

Technical Field

The present disclosure generally relates to a technique of a control system and a control device for a human-powered vehicle.

Background Information

For example, a human-powered vehicle disclosed in Japanese Laid-Open Patent Publication No. 2020-69888 A (Patent Literature 1) is configured to be able to tow a carrier by a riding portion.

SUMMARY

There is a demand for a technique capable of controlling an electrical component of a human-powered vehicle in accordance with a swivel state of a riding portion and a carrier.

An object of the present disclosure is to provide a control system and a control device for a human-powered vehicle capable of controlling an electrical component of the human-powered vehicle in accordance with a swivel state of a riding portion towing a carrier and the carrier.

A control system according to a first aspect of the present disclosure includes a sensor configured to output a signal corresponding to a pivot angle of a pivot portion provided between a riding portion and a carrier, the riding portion being located between the carrier and a handle, an electrical component, and an electronic controller configured to control the electrical component in accordance with the signal output from the sensor.

The control system of the first aspect can control the electrical component of a human-powered vehicle in accordance with a swivel state of the riding portion and the carrier. By controlling the electrical component of the human-powered vehicle in accordance with the swivel state of the riding portion towing the carrier, smooth and stable traveling of the human-powered vehicle can be provided.

In the control system of a second aspect according to the first aspect, the electrical component includes a drive unit including a motor configured to apply a propulsive force to the human-powered vehicle.

The control system of the second aspect can control the drive unit in accordance with the swivel state of the riding portion and the carrier. By controlling the drive unit in accordance with the swivel state of the riding portion and the carrier, the propulsive force applied to the human-powered vehicle can be controlled in accordance with the swivel state, and the smooth and stable traveling of the human-powered vehicle can be provided.

In the control system of a third aspect according to the second aspect, the electronic controller is configured to control the motor in a first control state where the pivot angle is a first pivot angle, and the electronic controller is configured to control the motor in a second control state different from the first control state where the pivot angle is a second pivot angle smaller than the first pivot angle.

The control system of the third aspect can perform different control of the motor of the drive unit in accordance with a difference of the swivel state of the riding portion and the carrier.

In the control system of a fourth aspect according to the third aspect, the electronic controller is configured to set a maximum output value of the motor to a first output value in the first control state.

The control system of the fourth aspect can control the motor in a suitable manner for a case where the swivel state of the carrier and the riding portion is large.

In the control system of a fifth aspect according to the fourth aspect, the electronic controller is configured to set the maximum output value of the motor to a second output value in the second control state. The second output value is larger than the first output value.

The control system of the fifth aspect can control the motor in a suitable manner for a case where the swivel state of the carrier and the riding portion is small.

In the control system of a sixth aspect according to the fifth aspect, the electronic controller is configured to set a response speed of the motor into a first response speed where output of the motor increases in the first control state.

The control system of the sixth aspect can control the motor in a suitable manner for a case where the swivel state of the carrier and the riding portion is large.

In the control system of a seventh aspect according to the sixth aspect, in the second control state, the electronic controller is configured to set the response speed of the motor into a second response speed where the output of the motor increases, the second response speed being higher than the first response speed.

The control system of the seventh aspect can control the motor in a suitable manner for a case where the swivel state of the carrier and the riding portion is small.

In the control system of an eighth aspect according to the third aspect, in the first control state, the electronic controller is configured to set a maximum output ratio of the motor to a human driving force input to the human-powered vehicle to a first maximum output ratio.

The control system of the eighth aspect can control the motor in a suitable manner for a case where the swivel state of the carrier and the riding portion is large.

In the control system of a ninth aspect according the eighth aspect, the electronic controller is configured to set the maximum output ratio of the motor to the human driving force input to the human-powered vehicle to a second maximum output ratio. The second maximum output ratio is greater than the first maximum output ratio in the second control state.

The control system of the ninth aspect can control the motor in a suitable manner for a case where the swivel state of the carrier and the riding portion is small.

In the control system of a tenth aspect according to the third aspect, the electronic controller is configured to stop the motor in a case where a traveling speed of the human-powered vehicle exceeds a first traveling speed in the first control state.

The control system of the tenth aspect can control the motor in a suitable manner for a case where the swivel state of the carrier and the riding portion is large.

In the control system of an eleventh aspect according to the tenth aspect, the electronic controller is configured to stop the motor in a case where the traveling speed of the human-powered vehicle exceeds a second traveling speed in the second control state. The second traveling speed is greater than the first traveling speed.

The control system of the eleventh aspect can control the motor in a suitable manner for a case where the swivel state of the carrier and the riding portion is small.

In the control system of a twelfth aspect according to the first aspect, the electrical component includes at least one of a drive unit, an electric suspension, an electric seatpost, an electric rear derailleur, an electric front derailleur, an electric clutch, an electronic terminal, a display, a vibration generator, a light generator, or a sound generator.

The control system of the twelfth aspect can control the electrical component of the human-powered vehicle in accordance with the swivel state of the riding portion and the carrier.

A control device for a human-powered vehicle according to a thirteenth aspect of the present disclosure includes an electronic controller configured to control an electrical component of the human-powered vehicle in accordance with a pivot state detected by a sensor configured to output a signal corresponding to a pivot angle of a pivot portion provided between a riding portion and a carrier, the riding portion being located between the carrier and a handle.

The control device for a human-powered vehicle of the thirteenth aspect can control the electrical component of the human-powered vehicle in accordance with the swivel state of the riding portion and the carrier.

The control system and the control device for a human-powered vehicle of the present disclosure can control the electrical component of the human-powered vehicle in accordance with the swivel state of the riding portion and the carrier.

BRIEF DESCRIPTION OF DRAWINGS

Referring now to the attached drawings which form a part of this original disclosure.

DETAILED DESCRIPTION OF EMBODIMENTS

Figure 1:
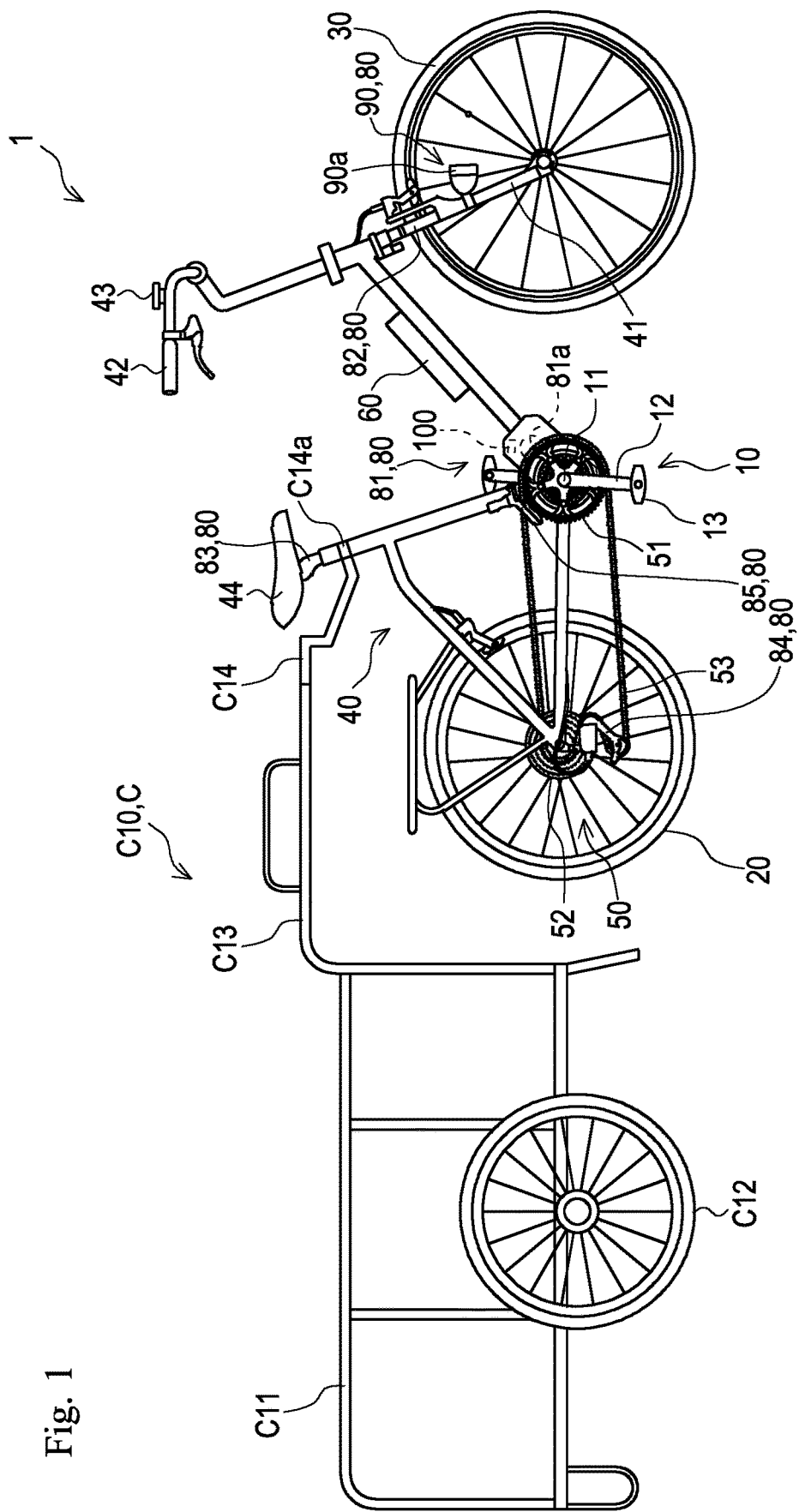
FIG. 1 is a side elevational view of a human-powered vehicle including a control system according to a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle 1 including a control system 70 according to a first embodiment will be described with reference to FIGS. 1 to 3. The human-powered vehicle 1 is a vehicle that has at least one wheel and can be driven by at least a human driving force. The human-powered vehicle 1 includes various types of bicycles such as a mountain bike, a road bike, a city bike, a cargo bike, a hand bike, and a recumbent bike. The number of wheels included in the human-powered vehicle 1 is not limited. The human-powered vehicle 1 includes, for example, a single-wheeled vehicle and a vehicle having two or more wheels. The human-powered vehicle 1 is not limited to a vehicle that can be driven only by a human driving force. The human-powered vehicle 1 includes an E-bike that uses not only a human driving force but also a driving force of an electric motor for propulsion. The E-bike includes a power-assisted bicycle whose propulsion is assisted by an electric motor. Hereinafter, in the embodiment, the human-powered vehicle 1 is described as a bicycle.

The human-powered vehicle 1 includes a crank 10, a rear wheel 20, a front wheel 30, a frame 40, a drive mechanism 50, a battery 60, and the control system 70. The crank 10 illustrated in FIG. 1 includes a crankshaft 11 rotatable with respect to the frame 40 and a pair of crank arms 12 provided at both ends in an axial direction of the crankshaft 11. A pedal 13 is coupled to each of the crank arms 12.

The rear wheel 20 and the front wheel 30 are supported by the frame 40. The front wheel 30 is attached to a front fork 41 provided at a front part of the frame 40. A handle 42 is coupled to the front fork 41. The handle 42 is provided with an operation device 43 for operating an electrical component 80. In the present embodiment, the operation device 43 includes a cycle computer. The operation device 43 outputs a signal corresponding to an operation by a user to an electronic controller 101. The rear wheel 20 is attached to a rear part of the frame 40. A riding portion 44 is provided on an upper part of the frame 40. The riding portion 44 includes a seat. The riding portion 44 can further include a seatpost.

The drive mechanism 50 couples the crank 10 to the rear wheel 20. The drive mechanism 50 includes a first rotating body 51 coupled to the crankshaft 11, a second rotating body 52 coupled to the rear wheel 20, and a chain 53 coupling the first rotating body 51 to the second rotating body 52.

The first rotating body 51 includes at least one front sprocket. In the present embodiment, the first rotating body 51 includes more than two front sprockets. The first rotating body 51 can include one front sprocket. In a case where the first rotating body 51 includes two or more front sprockets having different numbers of teeth, in a state where the first rotating body 51 is attached to the human-powered vehicle 1, a front sprocket having the largest number of teeth is disposed farther from a center surface of the frame 40 of the bicycle than a front sprocket having the smallest number of teeth.

The second rotating body 52 includes at least one rear sprocket. The second rotating body 52 includes two or more rear sprockets having different numbers of teeth. The second rotating body 52 can include twelve or more rear sprockets having different numbers of teeth. In a case where the second rotating body 52 includes two or more front sprockets, in a state where the second rotating body 52 is attached to the human-powered vehicle 1, a rear sprocket having the largest number of teeth is disposed closer to the center surface of the frame 40 of the bicycle than a rear sprocket having the smallest number of teeth. The chain 53 couples one front sprocket included in the first rotating body 51 to one rear sprocket included in the second rotating body 52. A rotational force of the first rotating body 51 is transmitted to the rear sprocket through the chain 53.

The drive mechanism 50 of the present embodiment transmits the front sprocket, the rear sprocket, and the rotational force using the chain 53, but the configuration of the drive mechanism 50 is not limited. For example, the first rotating body 51 and the second rotating body 52 can include a pulley, a bevel gear, or the like instead of the sprocket. The first rotating body 51 and the second rotating body 52 can be coupled by a belt, a shaft, or the like instead of the chain 53.

A first one-way clutch can be provided between the crankshaft 11 and the first rotating body 51. The first one-way clutch causes the first rotating body 51 to rotate forward in a case where the crank 10 rotates forward, and allows relative rotation of the crankshaft 11 and the first rotating body 51 in a case where the crank 10 rotates rearward. A second one-way clutch is provided between the second rotating body 52 and the rear wheel 20. The second one-way clutch causes the rear wheel 20 to rotate forward in a case where the second rotating body 52 rotates forward, and allows relative rotation of the second rotating body 52 and the rear wheel 20 in a case where the second rotating body 52 rotates rearward.

The battery 60 supplies power to the electrical component 80 provided in the human-powered vehicle 1. The battery 60 is provided in at least one of the inside or the outside of the frame 40. The battery 60 can supply power to the electrical component 80 and a control device 100 for the human-powered vehicle 1. The battery 60 can be capable of supplying power to a drive unit 81. The battery 60 can include a plurality of batteries and can supply power to each of a plurality of electrical components 80. A single battery 60 can supply power to the electrical component 80 and the drive unit 81. The battery 60 can be provided directly on the electrical component 80.

Figure 2:
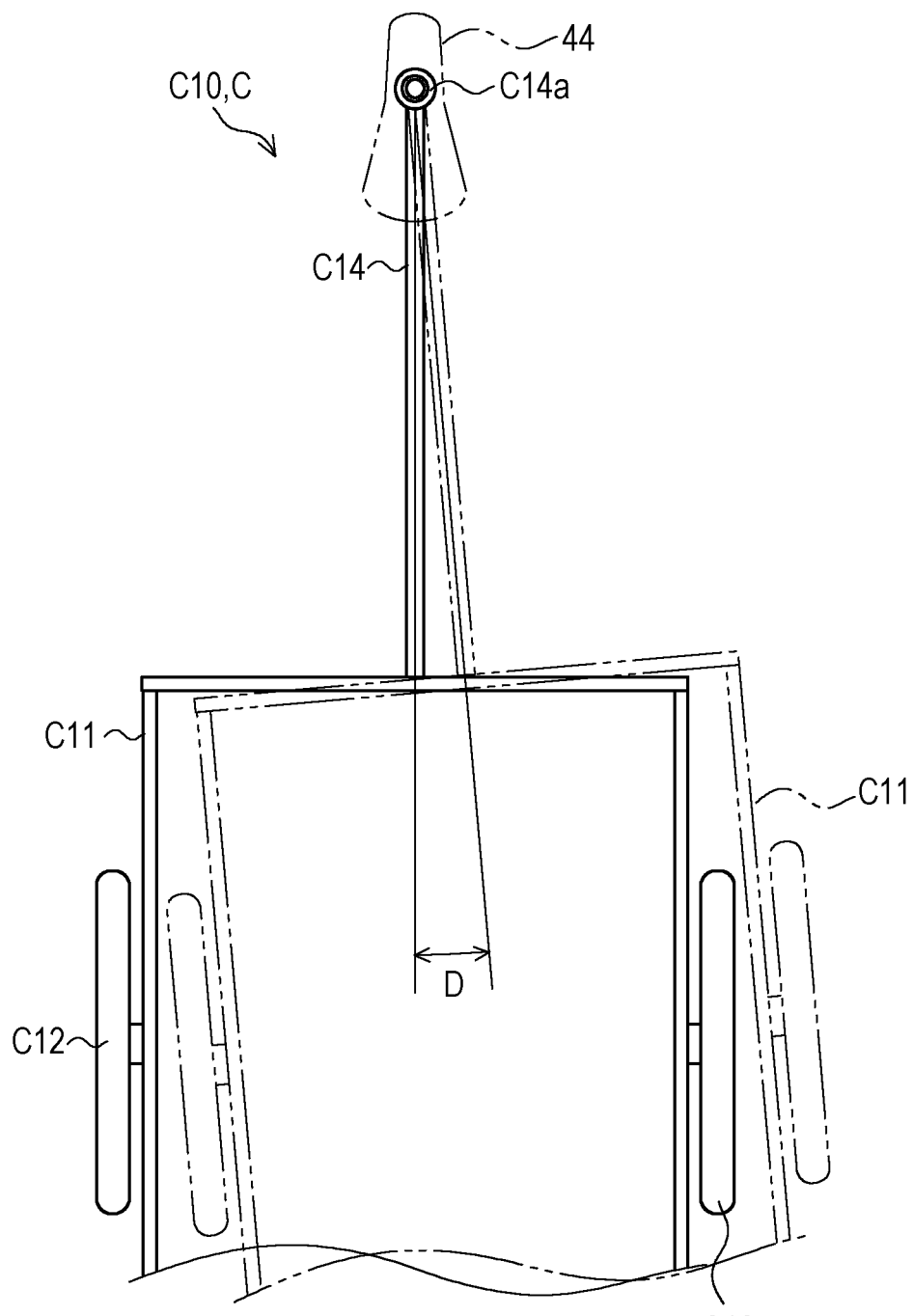
FIG. 2 is a plan view illustrating an example of a pivot angle.

A carrier C is detachably attached to the human-powered vehicle 1 illustrated in FIG. 1. The carrier C is coupled to the frame 40 so as to be pivotable relative to the riding portion 44. The riding portion 44 tows the carrier C via the frame 40 during traveling of the human-powered vehicle 1. In the present embodiment, the carrier C includes a towed vehicle C10.

The towed vehicle C10 includes a body C11, a wheel C12, and a coupling portion C14. The towed vehicle C10 further includes a connecting portion C13. The body C11 is configured to be able to support at least one of a person or a cargo that is loaded to the body C11. The body C11 is disposed at a rear part of the human-powered vehicle 1. The wheel C12 is provided on the body C11. The connecting portion C13 connects the body C11 and the coupling portion C14 to each other. The connecting portion C13 can be configured integrally with at least one of the body C11 or the coupling portion C14. The connecting portion C13 can be configured separately from the body C11 and the coupling portion C14. The connecting portion C13 can load a cargo. The coupling portion C14 can be coupled to the human-powered vehicle 1. In the present embodiment, the coupling portion C14 includes a pivot portion C14a configured to be coupled to the frame 40. As illustrated in FIGS. 1 and 2, the pivot portion C14a is coupled to the frame 40 so as to rotate relative to the riding portion 44 in a yaw direction. The pivot portion C14a is coupled to a portion of the frame 40 that supports an electric seatpost 83. The towed vehicle C10 can be coupled to the human-powered vehicle 1 so as to be disposed in front of or on a side of the human-powered vehicle 1. The towed vehicle C10 can be configured by omitting the connecting portion C13.

The control system 70 is the control system 70 for the human-powered vehicle, the control system including a sensor 110 configured to output a signal corresponding to a pivot angle D of the pivot portion C14a provided between the riding portion 44 and the carrier C, the riding portion 44 being located between the carrier C and the handle 42, the electrical component 80, and the electronic controller 101 configured to control the electrical component 80 in accordance with the signal output from the sensor 110. The term "sensor" as used herein refers to a physical device or instrument designed to detect the presence or absence of a particular event, object, substance, or a change in its environment, and to emit a signal in indicative of the detection. The term "sensor" as used herein does not include a human being. FIG. 3 illustrates an example of the control system 70. The control system 70 illustrated in FIG. 3 includes the electrical component 80, the control device 100 for the human-powered vehicle, and the sensor 110. In the present specification, the control device 100 for a human-powered vehicle can be described as the control device 100.

Figure 3:
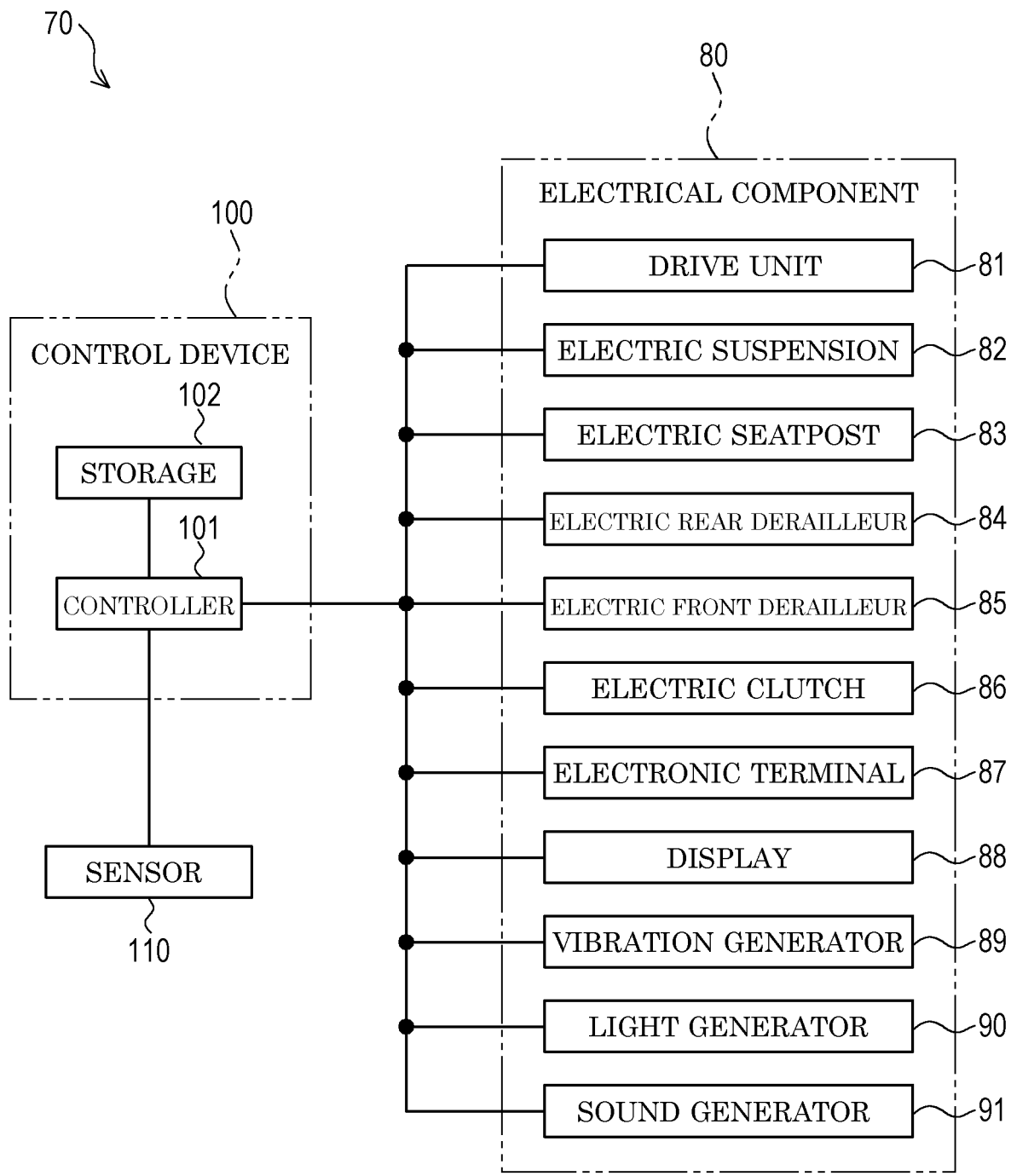
FIG. 3 is a block diagram illustrating the control system.

The electrical component 80 illustrated in FIGS. 1 and 3 electrically operates in accordance with at least one condition different from the operation of the operation device 43 and the operation of the operation device 43. The electrical component 80 includes at least one of the drive unit 81, an electric suspension 82, the electric seatpost 83, an electric rear derailleur 84, an electric front derailleur 85, an electric clutch 86, an electronic terminal 87, a display 88, a vibration generator 89, a light generator 90, or a sound generator 91. The electrical component 80 includes the drive unit 81 including a motor 81a for applying a propulsive force to the human-powered vehicle 1. In the present embodiment, the electrical component 80 includes the drive unit 81, the electric suspension 82, the electric seatpost 83, the electric rear derailleur 84, the electric front derailleur 85, the electric clutch 86, the electronic terminal 87, the display 88, the vibration generator 89, the light generator 90, and the sound generator 91.

The drive unit 81 assists in the propulsion of the human-powered vehicle 1. The motor 81a of the drive unit 81 operates in accordance with, for example, a human driving force input to the human-powered vehicle 1. Specifically, the electronic controller 101 controls the motor 81a of the drive unit 81 in accordance with the human driving force input to the crank 10 provided in the human-powered vehicle 1. The drive unit 81 can include a speed reducer that couples the motor 81a and the crank 10 in addition to the motor 81a.

The electric suspension 82 absorbs an impact applied to the human-powered vehicle 1. The electric suspension 82 includes at least one of an electric rear suspension corresponding to the rear wheel 20 or an electric front suspension corresponding to the front wheel 30. In the present embodiment, the electric suspension 82 includes an electric front suspension corresponding to the front wheel 30.

The electric seatpost 83 changes a height of the riding portion 44. In the present embodiment, the height of the riding portion 44 with respect to the frame 40 is changed in accordance with the driving of the electric seatpost 83.

The electric rear derailleur 84 changes a transmission ratio as a ratio of a rotational speed of the rear wheel 20 to a rotational speed of the crankshaft 11. The transmission ratio is calculated by dividing the number of teeth of the front sprocket with which the chain 53 is engaged by the number of teeth of the rear sprocket with which the chain 53 is engaged. The electric rear derailleur 84 can change the transmission ratio of the human-powered vehicle 1 by moving the chain 53 between a plurality of rear sprockets.

The electric front derailleur 85 changes the transmission ratio. The electric front derailleur 85 can change the transmission ratio of the human-powered vehicle 1 by moving the chain 53 between a plurality of front sprockets.

The electric clutch 86 connects the second rotating body 52 and the rear wheel 20, for example. The electric clutch 86 includes a first transmission state and a second transmission state. The first transmission state is a state in which rotational power in a direction in which the crank 10 of the second rotating body 52 rotates forward is transmitted to the rear wheel 20, and rotational power in a direction in which the crank 10 of the rear wheel 20 rotates forward is not transmitted to the second rotating body 52. In the first transmission state, the rotational power in the direction in which the crank 10 of the rear wheel 20 rotates forward is not transmitted to the second rotating body 52, but rotational power in a direction in which the crank 10 of the rear wheel 20 rotates rearward is transmitted to the second rotating body 52. The second transmission state is a state in which the rotational power in at least the direction in which the crank 10 of the rear wheel 20 rotates forward is transmitted to the second rotating body 52. The electric clutch 86 can be provided between the first rotating body 51 and the motor 81a of the drive unit 81.

The electronic terminal 87 performs calculation processing and outputs a result of the calculation processing and the like. The electronic terminal 87 can output a result of the calculation processing or the like by at least one of display of a message by a display unit, generation of vibration by a vibrate function, output of light by a lamp, or output of voice by a speaker. The electronic terminal 87 can be provided in the human-powered vehicle 1 or carried by the user of the human-powered vehicle 1. The electronic terminal 87 includes, for example, a cycle computer, a smartphone, a tablet terminal, or the like. In the present embodiment, the electronic terminal 87 includes the operation device 43.

The display 88 displays various information. The display 88 can be provided to the human-powered vehicle 1 or carried by the user of the human-powered vehicle 1. The display 88 includes, for example, a liquid crystal display, an organic EL display, or the like.

The vibration generator 89 generates vibration. The vibration generator 89 can be provided to the human-powered vehicle 1 or carried by the user of the human-powered vehicle 1. The vibration generator 89 includes, for example, an electric motor including an eccentric weight.

The light generator 90 generates light. The light generator 90 can be provided to the human-powered vehicle 1 or carried by the user of the human-powered vehicle 1. The light generator 90 includes, for example, the display 88, a front lamp 90a, a tail lamp, and the like.

The sound generator 91 generates sound. The sound generator 91 can be provided to the human-powered vehicle 1 or carried by the user of the human-powered vehicle 1. The sound generator 91 includes, for example, a buzzer, a speaker, and the like.

The control device 100 for the human-powered vehicle 1 includes an electronic controller 101 that controls the electrical component 80 of the human-powered vehicle 1 in accordance with a pivot state detected by the sensor 110 that outputs the signal corresponding to the pivot angle D of the pivot portion C14a provided between the riding portion 44 and the carrier C, the riding portion 44 being located between the carrier C and the handle 42. FIG. 3 illustrates an example of the control device 100. The control device 100 illustrated in FIG. 3 includes the electronic controller 101 and a storage 102.

The electronic controller 101 performs control related to the human-powered vehicle 1. The electronic controller 101 is a hardware device that manages and/or directs the flow of data for controlling the drive unit 81, the electric suspension 82, the electric seatpost 83, the electric rear derailleur 84, the electric front derailleur 85, the electric clutch 86, the electronic terminal 87, the display 88, the vibration generator 89, the light generator 90 and the sound generator 91. The electronic controller 101 includes a calculation processor that executes a predetermined control program. The calculation processor includes, for example, a central processing unit (CPU) or a micro processing unit (MPU). The electronic controller 101 can include one or a plurality of microcomputers. The electronic controller 101 is formed of one or more semiconductor chips that are mounted on a circuit board. Thus, the terms "electronic controller" and "controller" as used herein refers to hardware that executes a software program, and does not include a human being.

The storage 102 stores information used for various control programs and various control processing. The storage 102 is any computer storage device or any non-transitory computer-readable medium with the sole exception of a transitory, propagating signal. The storage 102 stores information used for various control programs and various control processing. The storage 102 includes, for example, a nonvolatile memory and a volatile memory. For example, the storage 102 can include an internal memory, or other type of memory devices such as a ROM (Read Only Memory) device, a RAM (Random Access Memory) device, a hard disk, a flash drive, etc. The electronic controller 101 stores and reads data and/or programs from the storage 102.

The electronic controller 101 is configured to be able to control the motor 81a of the drive unit 81 in a plurality of control states. The plurality of control states include a first control state and a second control state different from the first control state. In a first control mode, the electronic controller 101 controls the motor 81a in the first control state. In a second control mode different from the first control mode, the electronic controller 101 controls the motor 81a in the second control state.

The electronic controller 101 controls the motor 81a in accordance with a predetermined condition in the first control state and the second control state. For example, the electronic controller 101 controls output of the motor 81a in accordance with the human driving force or the like in the first control state and the second control state.

The sensor 110 detects the pivot state. The pivot state indicates a relative swivel state of the riding portion 44 and the carrier C. In the present embodiment, the sensor 110 detects the pivot angle D illustrated in FIG. 2. The pivot angle D indicates a relative rotation angle in the yaw direction of the carrier C with respect to the human-powered vehicle 1. The pivot angle D can indicate a relative rotation angle in the yaw direction of the human-powered vehicle 1 with respect to the carrier C.

The sensor 110 includes a sensor provided on at least one of the human-powered vehicle 1 or the carrier C. In the present embodiment, the sensor 110 includes a sensor provided on the human-powered vehicle 1. The sensor 110 provided on the human-powered vehicle 1 includes a gyro sensor provided in the frame 40. In a case where the sensor 110 is provided on the carrier C, the sensor 110 can include a gyro sensor provided on the pivot portion C14a. In a case where the sensor 110 is provided on the human-powered vehicle 1 and the carrier C, the sensor 110 can include an acceleration sensor provided on the human-powered vehicle 1 and the carrier C. The acceleration sensor provided on the human-powered vehicle 1 and the carrier C can detect the pivot angle D on the basis of acceleration of the human-powered vehicle 1 and acceleration of the carrier C.

The sensor 110 outputs a signal corresponding to the pivot angle D to the electronic controller 101. The electronic controller 101 acquires information on the pivot state on the basis of a detection value detected by the sensor 110. The electronic controller 101 estimates the pivot angle D on the basis of the detection value detected by the sensor 110. The electronic controller 101 can calculate the pivot angle D on the basis of the detection value or can estimate the pivot angle D on the basis of a table stored in advance. Note that the sensor 110 can determine the pivot angle D on the basis of the detection value. The electronic controller 101 controls the electrical component 80 in accordance with the pivot state. In the present embodiment, the electronic controller 101 controls the drive unit 81 in accordance with the pivot state. The electronic controller 101 controls the motor 81a in the first control state in a case where the pivot angle D is a first pivot angle, and the electronic controller 101 controls the motor 81a in the second control state different from the first control state in a case where the pivot angle D is a second pivot angle smaller than the first pivot angle.

The first pivot angle includes at least one angle greater than 0°. In the present embodiment, the first pivot angle includes a range of a predetermined angle. The storage 102 stores the first pivot angle.

The second pivot angle includes at least one angle smaller than the first pivot angle. In the present embodiment, the second pivot angle includes a range of a predetermined angle smaller than the first pivot angle. The storage 102 stores the second pivot angle. The second pivot angle can include 0°.

Figure 4:
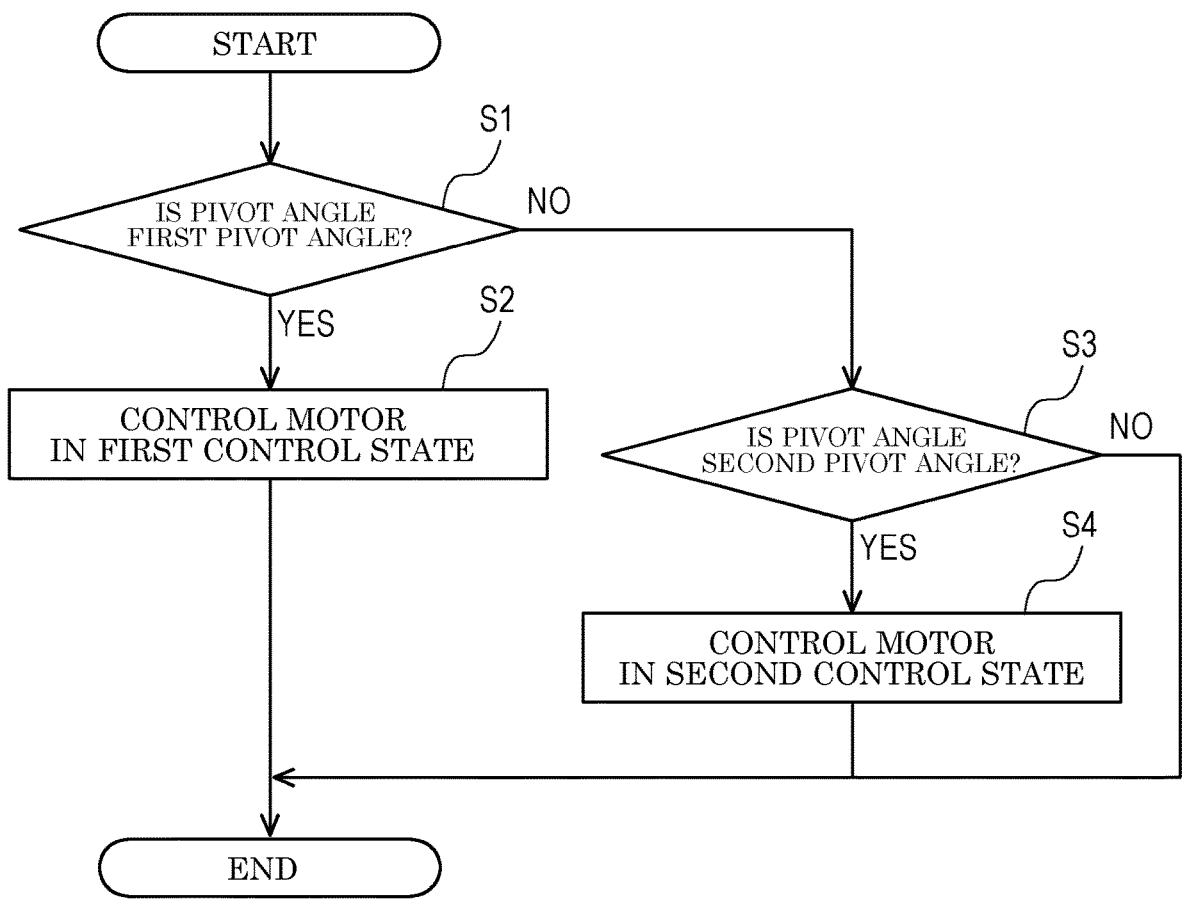
FIG. 4 is a flowchart illustrating a control flow in a first embodiment.

An example of control executed by the electronic controller 101 will be described with reference to FIG. 4. The electronic controller 101 starts a first control flow according to a flowchart illustrated in FIG. 4 in a case where a predetermined condition is satisfied. In the present embodiment, the electronic controller 101 starts the first control flow in response to input of the human driving force to the human-powered vehicle 1. The electronic controller 101 can start the first control flow when power feeding from the battery 60 to the electronic controller 101 is started and a predetermined operation is performed in the operation device 43. When the first control flow ends, the electronic controller 101 repeatedly executes the first control flow at predetermined time intervals until the predetermined condition is satisfied. In the present embodiment, the electronic controller 101 repeatedly executes the first control flow at predetermined time intervals until the predetermined operation is performed in the operation device 43. The electronic controller 101 can repeatedly execute the first control flow until the human driving force is no longer input to the human-powered vehicle 1.

In step S1, the electronic controller 101 acquires information on the pivot angle D on the basis of the signal output from the sensor 110. The signal output from the sensor 110 can include information of the pivot angle D, and can include information used by the electronic controller 101 to perform at least one of determination or calculation of the pivot angle D. The electronic controller 101 determines the pivot angle D on the basis of the signal output from the sensor 110. In a case where the pivot angle D is greater than or equal to a predetermined threshold, the electronic controller 101 determines that the pivot angle D is the first pivot angle. The predetermined threshold is stored in the storage 102. The predetermined threshold can be changeable by a user. In a case where the first pivot angle includes a range of a predetermined angle, the electronic controller 101 can determine that the pivot angle D is the first pivot angle in a case where the pivot angle D is within the range of the first pivot angle.

In a case where the pivot angle D is the first pivot angle, the electronic controller 101 causes the processing to proceed to step S2. In a case where the pivot angle D is not the first pivot angle, the electronic controller 101 causes the processing to proceed to step S3. In step S2, the electronic controller 101 controls the motor 81a in the first control state. After performing the processing of step S2, the electronic controller 101 ends the first control flow.

In a case where the pivot angle D acquired in step S1 is less than the predetermined threshold, the electronic controller 101 determines in step S3 that the pivot angle D is the second pivot angle. In a case where the second pivot angle includes a range of a predetermined angle, the electronic controller 101 can determine that the pivot angle D is the second pivot angle in a case where the pivot angle D is within the range of the second pivot angle.

In a case where the electronic controller 101 determines that the pivot angle D is the second pivot angle, the processing proceeds to step S4. In a case where the pivot angle D is not the second pivot angle, the electronic controller 101 ends the first control flow. In step S4, the electronic controller 101 controls the motor 81a in the second control state. After performing the processing of step S4, the electronic controller 101 ends the first control flow. In the first control flow, in a case where the pivot angle D is not the first pivot angle or the second pivot angle, it is conceivable that the pivot angle D cannot be detected due to, for example, a failure of the sensor 110 and a mounting state of the sensor 110. In the case where the pivot angle D is not the first pivot angle or the second pivot angle, the electronic controller 101 can perform assist control not based on the pivot angle D.

The electronic controller 101 can control the electrical component 80 of the human-powered vehicle 1 in accordance with the swivel state of the riding portion 44 towing the carrier C and the carrier C by executing the first control flow to change the control state. In the present embodiment, the electronic controller 101 can control the drive unit 81 in accordance with the swivel state of the riding portion 44 towing the carrier C and the carrier C. The electronic controller 101 can perform different control of the motor 81a of the drive unit 81 in accordance with a difference of the swivel state of the riding portion 44 towing the carrier C and the carrier C.

In the present embodiment, the electronic controller 101 can control the motor 81a in the first control state in a case where the pivot angle D is the first pivot angle greater than the second pivot angle. The electronic controller 101 can control the motor 81a in the second control state in a case where the pivot angle D is the second pivot angle smaller than the first pivot angle.

Second Embodiment

The control system 70 according to a second embodiment will be described with reference to FIGS. 5 to 7. Components common to those in the first embodiment are denoted by the same reference signs as those in the first embodiment, and redundant description will be omitted.

The electronic controller 101 controls the motor 81a of the drive unit 81 in accordance with the human driving force input to the human-powered vehicle 1 in the first control state and the second control state. FIG. 5 illustrates an example of a graph used when the motor 81a of the drive unit 81 is controlled in accordance with the human driving force. In FIGS. 5 and 6, the output of the motor 81a is described as motor output. In the present specification, the output of the motor 81a can be described as motor output. In a case where the drive unit 81 includes a speed reducer, the motor output is output that is input to the human-powered vehicle 1 as an auxiliary propulsive force via the speed reducer. The motor output is indicated in the same unit as the human driving force, for example. For example, the motor output is indicated by at least one of rotational torque of the motor 81a or a rotation speed of the motor 81a. The motor output can be indicated by power of the motor 81a, which is a product of the rotational torque of the motor 81a and the rotation speed of the motor 81a, or by a driving force.

The electronic controller 101 starts driving of the motor 81a when the human driving force becomes greater than or equal to a first threshold T1. When starting the driving of the motor 81a, the electronic controller 101 controls the motor 81a such that the motor output increases in proportion as the human driving force increases. When the human driving force becomes greater than or equal to a second threshold T2, the electronic controller 101 controls the motor 81a such that the motor output maintains a maximum output value PM of the motor 81a. When the human driving force becomes larger than or equal to the second threshold T2, the electronic controller 101 controls the motor 81a such that the motor output does not exceed the maximum output value PM of the motor 81a.

The maximum output value PM of the motor 81a defines an upper limit value of the output of the motor 81a in a case where the electronic controller 101 controls the motor 81a. The maximum output value PM of the motor 81a is different from a maximum output value based on performance of the motor 81a. The second threshold T2 is greater than the first threshold T1. The electronic controller 101 controls the motor 81a such that an output ratio of the motor with respect to the human driving force does not exceed a predetermined ratio. The electronic controller 101 controls the motor 81a such that the motor output does not exceed the maximum output value PM even when the output ratio of the motor with respect to the human driving force is within a range of the predetermined ratio. A relationship between the human driving force and the motor output is defined in accordance with a relationship between a traveling speed of the human-powered vehicle 1 and a road traffic law.

Figure 6:
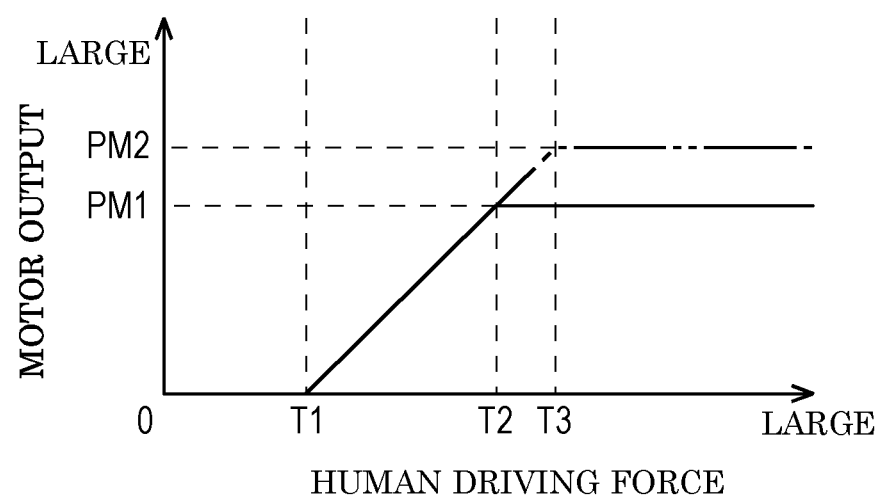
FIG. 6 is a graph illustrating an example of a first output value and a second output value in accordance with the second embodiment.

As illustrated in FIG. 6, the maximum output value PM of the motor 81a includes a first output value PM1 and a second output value PM2. The second output value PM2 is different from the first output value PM1. In the present embodiment, the second output value PM2 is greater than the first output value PM1. The first output value PM1 and the second output value PM2 can be stored in the storage 102.

The electronic controller 101 sets the maximum output value PM of the motor 81a to the first output value PM1 or the second output value PM2. In a case where the electronic controller 101 sets the maximum output value PM of the motor 81a to the first output value PM1, the electronic controller 101 controls the motor 81a such that the motor output does not exceed the first output value PM1 even when the human driving force becomes larger than or equal to the second threshold T2. In a case where the electronic controller 101 sets the maximum output value PM of the motor 81a to the second output value PM2, the electronic controller 101 controls the motor 81a such that the motor output does not exceed the second output value PM2 even when the human driving force becomes larger than or equal to a third threshold T3. The third threshold T3 is greater than the second threshold T2.

The electronic controller 101 sets the maximum output value PM of the motor 81a such that the maximum output value PM of the motor 81a becomes a different output value in the first control state and the second control state. An example of control executed by the electronic controller 101 will be described with reference to FIG. 7.

Figure 7:
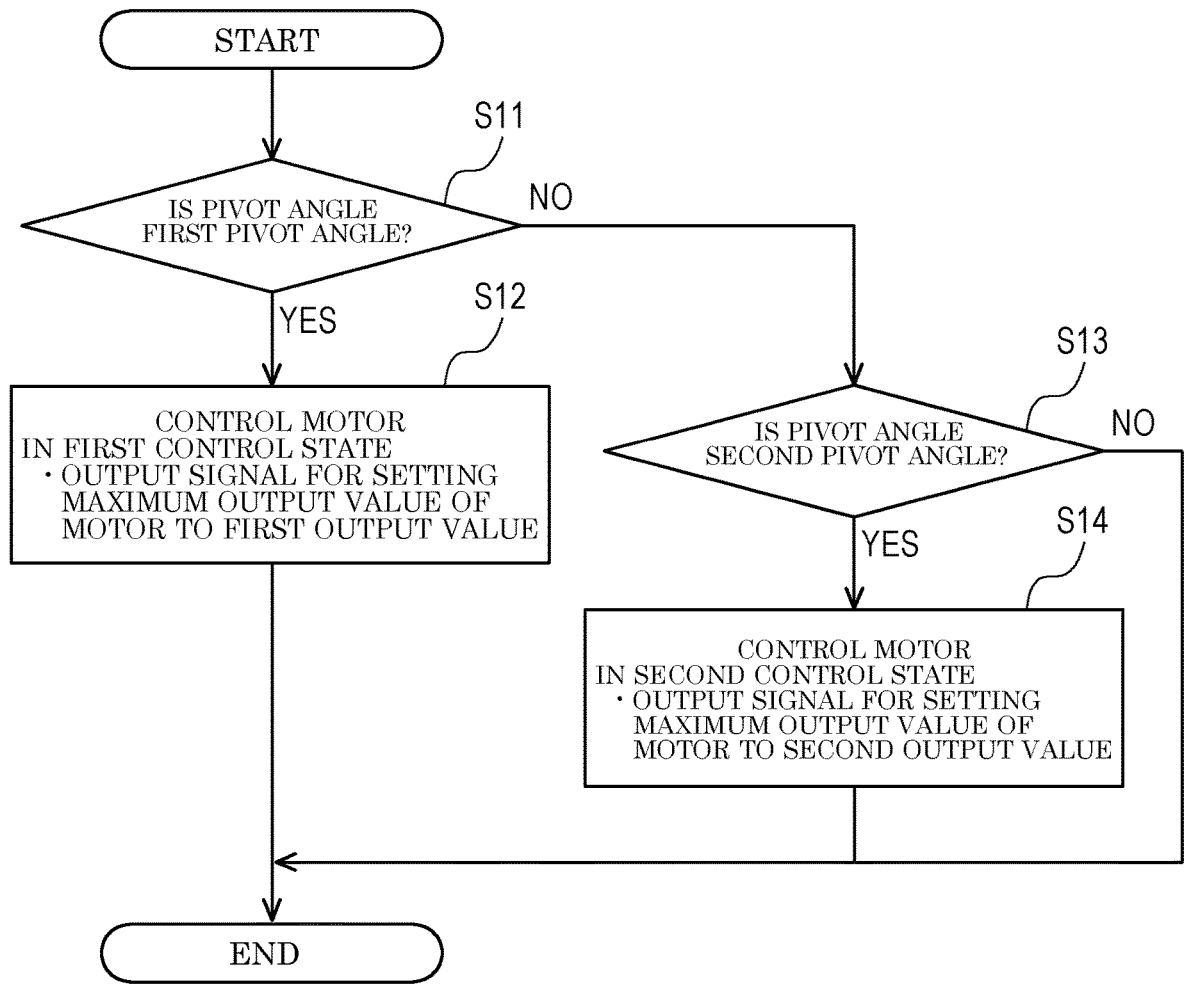
FIG. 7 is a flowchart illustrating a control flow in accordance with the second embodiment.

The electronic controller 101 starts a second control flow according to a flowchart illustrated in FIG. 7 when a predetermined condition is satisfied. When the second control flow ends, the electronic controller 101 repeatedly executes the second control flow at predetermined time intervals until the predetermined condition is satisfied. A condition for starting the second control flow and a condition for repeating the execution of the second control flow are similar to those of the first control flow in the first embodiment.

The electronic controller 101 determines whether the pivot angle D is the first pivot angle in step S11. In a case where the electronic controller 101 determines that the pivot angle D is the first pivot angle, the processing proceeds to step S12. In a case where the electronic controller 101 determines that the pivot angle D is not the first pivot angle, the processing proceeds to step S13.

In step S12, the electronic controller 101 controls the motor 81a in the first control state. The electronic controller 101 sets the maximum output value PM of the motor 81a to the first output value PM1 in the first control state. After performing the processing of step S12, the electronic controller 101 ends the second control flow.

The electronic controller 101 determines whether the pivot angle D is the second pivot angle in step S13. In a case where the electronic controller 101 determines that the pivot angle D is the second pivot angle, the processing proceeds to step S14. In a case where determining that the pivot angle D is not the second pivot angle, the electronic controller 101 ends the second control flow.

In step S14, the electronic controller 101 controls the motor 81a in the second control state. The electronic controller 101 sets the maximum output value PM of the motor 81a to the second output value PM2 in the second control state, the second output value PM2 being larger than the first output value PM1. After performing the processing of step S14, the electronic controller 101 ends the second control flow. In the second control flow, in a case where the pivot angle D is not the first pivot angle or the second pivot angle, it is conceivable that the pivot angle D cannot be detected due to, for example, a failure of the sensor 110 and the mounting state of the sensor 110. In a case where determining that the pivot angle D is not the first pivot angle in step S11 and then determining that the pivot angle D is not the second pivot angle in step S13, the electronic controller 101 can perform assist control not based on the pivot angle D.

The electronic controller 101 can control the motor 81a in a suitable manner for the swivel state of the carrier C and the riding portion 44 by executing the second control flow to set the maximum output value PM of the motor 81a. The electronic controller 101 can control the motor 81a in a suitable manner for a case where the swivel state of the carrier C and the riding portion 44 is large by executing the second control flow to set the maximum output value PM of the motor 81a. In the present embodiment, the electronic controller 101 sets the maximum output value PM of the motor 81a to the first output value PM1 in the first control state, the first output value PM1 being smaller than the second output value PM2, and reduces an assist force of the human-powered vehicle 1. By reducing the assist force of the human-powered vehicle 1, the electronic controller 101 can suppress an increase in the traveling speed of the human-powered vehicle 1 in a case where the swivel state of the carrier C and the riding portion 44 is large, for example, and thus the human-powered vehicle 1 is easy to maneuver in a small space. This improves traveling comfort and stability of the human-powered vehicle 1.

In a case where the pivot angle D is the second pivot angle smaller than the first pivot angle, the electronic controller 101 can control the motor 81a in a suitable manner for a case where the swivel state of the carrier C and the riding portion 44 is small by controlling the motor 81a in the second control state. In the present embodiment, the electronic controller 101 sets the maximum output value PM of the motor 81a to the second output value PM2 in the second control state, the second output value PM2 being larger than the first output value PM1. Accordingly, in a case where the swivel state of the carrier C and the riding portion 44 is small, the assist force of the human-powered vehicle 1 can be increased, and the traveling comfort and stability of the human-powered vehicle 1 are improved.

In the second control flow, the electronic controller 101 can reverse the setting of the maximum output value PM of the motor 81a between the first control state and the second control state. The electronic controller 101 sets the maximum output value PM of the motor 81a to the second output value PM2 in the first control state, the second output value PM2 being larger than the first output value PM1, by reversing the setting of the maximum output value PM of the motor 81a between the first control state and the second control state. In the first control state, the electronic controller 101 sets the maximum output value PM of the motor 81a to the second output value PM2, and thus the assist force of the human-powered vehicle 1 can be increased in a case where the swivel state of the carrier C and the riding portion 44 is large. The electronic controller 101 can increase a rising force of the human-powered vehicle 1 by increasing the assist force of the human-powered vehicle 1. Since the rising force of the human-powered vehicle 1 can be increased, the human-powered vehicle 1 easily returns from the state in which the swivel state of the carrier C and the riding portion 44 is large to a non-swivel state in which the carrier C and the riding portion 44 face the same direction.

Third Embodiment

The control system 70 according to a third embodiment will be described with reference to FIGS. 5, 8, and 9. Components common to those of the first and second embodiments are denoted by the same reference signs as those of the first and second embodiments, and redundant description will be omitted.

Figure 5:
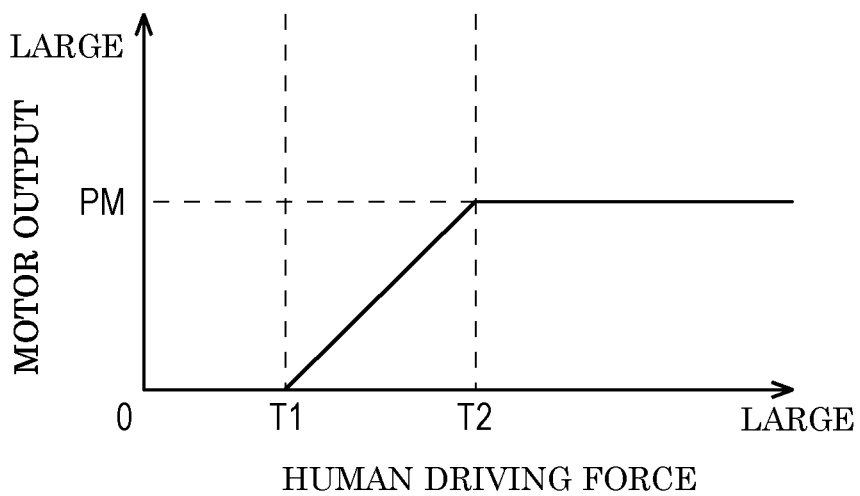
FIG. 5 is a graph illustrating an example of a relationship between a human driving force and a motor output in accordance with a second embodiment.
Figure 8:
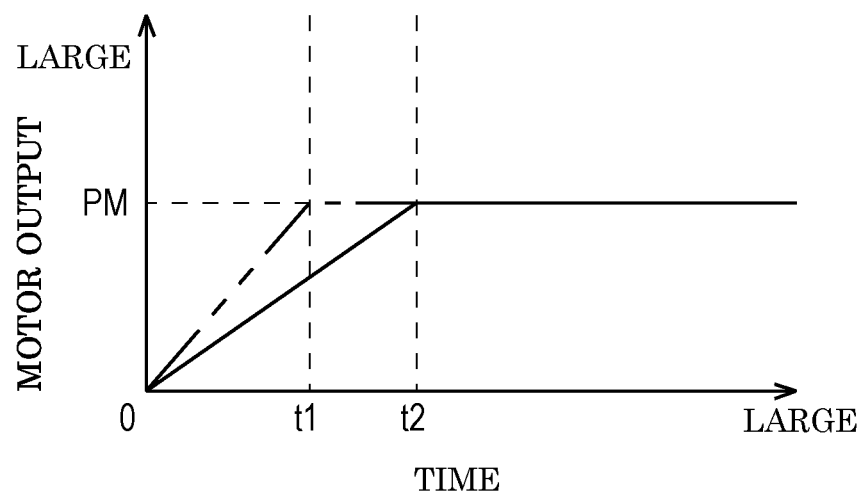
FIG. 8 is a graph illustrating an example of a response speed of a motor in accordance with a third embodiment.

FIG. 8 illustrates an example of a graph showing a relationship between time and motor output in a case where the human driving force greater than or equal to the second threshold T2 shown in FIG. 5 is input to the pedal 13. A slope of the graph illustrated in FIG. 8 indicates a response speed of the motor 81a in a case where the output of the motor 81a increases. In the present specification, the response speed of the motor 81a in the case where the output of the motor 81a increases can be described as a response speed of the motor 81a.

The response speed of the motor 81a includes a first response speed and a second response speed. The second response speed is different from the first response speed. In the present embodiment, the second response speed is faster than the first response speed. The slope of the graph indicated by a solid line in FIG. 8 indicates an example of the first response speed. The slope of the graph indicated by a two-dot chain line in FIG. 8 indicates an example of the second response speed. In response to the input of the human driving force in the first control state and the second control state, the electronic controller 101 controls the motor 81a in accordance with the first response speed or the second response speed.

In the present embodiment, in a case where controlling the motor 81a at the first response speed, the electronic controller 101 controls the motor 81a such that the output ratio of the motor 81a with respect to the human driving force at a point past time t2 becomes a first predetermined ratio in response to the input of the human driving force greater than or equal to the second threshold T2 to the pedal 13. The electronic controller 101 controls the motor 81a such that the output of the motor 81a does not exceed the maximum output value PM even in a case where controlling the output of the motor 81a at the first predetermined ratio at the time past time t2. In a case where controlling the motor 81a at the second response speed, the electronic controller 101 controls the motor 81a such that the output ratio of the motor 81a with respect to the human driving force at a point past time t1 becomes the first predetermined ratio in response to the input of the human driving force greater than or equal to the second threshold T2 to the pedal 13. Time required until time t1 is shorter than time required until time t2. The electronic controller 101 controls the motor 81a such that the output of the motor 81a does not exceed the maximum output value PM even in a case where controlling the output of the motor 81a at the first predetermined ratio at the time past time t1.

The electronic controller 101 sets the response speed of the motor 81a such that the response speed of the motor 81a becomes a different response speed in the first control state and the second control state. An example of control executed by the electronic controller 101 will be described with reference to FIG. 9.

Figure 9:
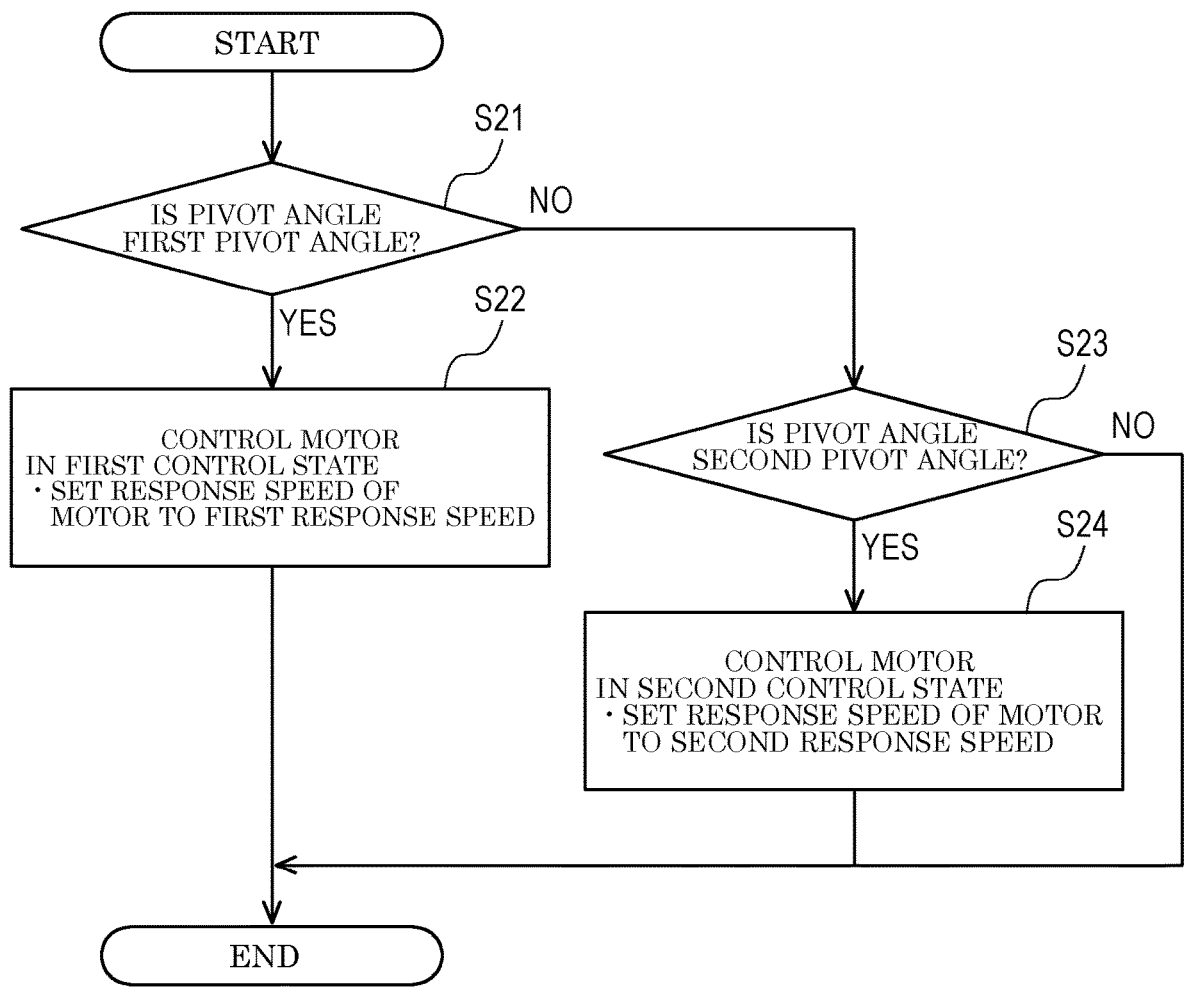
FIG. 9 is a flowchart illustrating a control flow in accordance with the third embodiment.

The electronic controller 101 starts a third control flow according to a flowchart illustrated in FIG. 9 in a case where a predetermined condition is satisfied. When the third control flow ends, the electronic controller 101 repeatedly executes the third control flow at predetermined time intervals until the predetermined condition is satisfied. A condition for starting the third control flow and a condition for repeating the execution of the third control flow are similar to those of the first control flow in the first embodiment.

The electronic controller 101 determines whether the pivot angle D is the first pivot angle in step S21. In a case where the electronic controller 101 determines that the pivot angle D is the first pivot angle, the processing proceeds to step S22. In a case where the electronic controller 101 determines that the pivot angle D is not the first pivot angle, the processing proceeds to step S23.

In step S22, the electronic controller 101 controls the motor 81a in the first control state. The electronic controller 101 sets a response speed of the motor 81a into a first response speed if output of the motor 81a increases in the first control state. After performing the processing of step S22, the electronic controller 101 ends the third control flow.

The electronic controller 101 determines whether the pivot angle D is the second pivot angle in step S23. In a case where the electronic controller 101 determines that the pivot angle D is the second pivot angle, the processing proceeds to step S24. In a case where determining that the pivot angle D is not the second pivot angle, the electronic controller 101 ends the third control flow.

In step S24, the electronic controller 101 controls the motor 81a in the second control state. The electronic controller 101 sets the response speed of the motor 81a into a second response speed if the output of the motor 81a increases in the second control state, the second response speed being higher than the first response speed. After performing the processing of step S24, the electronic controller 101 ends the third control flow. In the third control flow, in a case where the pivot angle D is not the first pivot angle or the second pivot angle, it is conceivable that the pivot angle D cannot be detected due to, for example, a failure of the sensor 110 and the mounting state of the sensor 110. In a case where determining that the pivot angle D is not the first pivot angle in step S21 and then determining that the pivot angle D is not the second pivot angle in step S23, the electronic controller 101 can perform assist control not based on the pivot angle D.

The electronic controller 101 controls the motor 81a in the first control state in a case where the pivot angle D is the first pivot angle larger than the second pivot angle. In a case where the pivot angle D is the first pivot angle, the electronic controller 101 can perform a suitable control for a case where the swivel state of the carrier C and the riding portion 44 is large by controlling the motor 81a in the first control state. In the present embodiment, the electronic controller 101 can gradually increase the output ratio of the motor 81a with respect to the human driving force input to the human-powered vehicle 1 by setting the response speed of the motor 81a to the first response speed slower than the second response speed in the first control state. By gradually increasing the output ratio of the motor 81a with respect to the human driving force input to the human-powered vehicle 1, the electronic controller 101 can suppress a sharp increase in the traveling speed of the human-powered vehicle 1 in a case where the swivel state of the carrier C and the riding portion 44 is large, for example, and thus the human-powered vehicle 1 is easy to maneuver in a small space. This improves traveling comfort and stability of the human-powered vehicle 1.

The electronic controller 101 controls the motor 81a in the second control state in a case where the pivot angle D is the second pivot angle smaller than the first pivot angle. In a case where the pivot angle D is the second pivot angle, the electronic controller 101 can perform a suitable control for a case where the swivel state of the carrier C and the riding portion 44 is small by controlling the motor 81a in the second control state. In the present embodiment, the electronic controller 101 can quickly increase the output ratio of the motor 81a with respect to the human driving force input to the human-powered vehicle 1 in a case where the swivel state of the carrier C and the riding portion 44 is small by setting the response speed of the motor 81a to the second response speed faster than the first response speed in the second control state. By quickly increasing the output ratio of the motor 81a with respect to the human driving force input to the human-powered vehicle 1 in a case where the swivel state of the carrier C and the riding portion 44 is small, the traveling comfort and stability of the human-powered vehicle 1 are improved.

In the third control flow, the electronic controller 101 can reverse the setting of the response speed of the motor 81a between the first control state and the second control state. The electronic controller 101 sets the response speed of the motor 81a into the second response speed faster than the first response speed in the first control state by reversing the setting of the response speed of the motor 81a between the first control state and the second control state. In the first control state, the electronic controller 101 sets the response speed of the motor 81a into the second response speed, and thus the assist force of the human-powered vehicle 1 can be quickly increased in a case where the swivel state of the carrier C and the riding portion 44 is large. The electronic controller 101 can quickly increase the rising force of the human-powered vehicle 1 by quickly increasing the assist force of the human-powered vehicle 1. Since the rising force of the human-powered vehicle 1 can be quickly increased, the human-powered vehicle 1 easily returns from the state in which the swivel state of the carrier C and the riding portion 44 is large to the non-swivel state.

Fourth Embodiment

The control system 70 according to a fourth embodiment will be described with reference to FIG. 10. Components common to those of the first to third embodiments are denoted by the same reference signs as those of the first to third embodiments, and redundant description will be omitted.

The electronic controller 101 controls the output of the motor 81a in accordance with a predetermined parameter in the first control state and the second control state. In the first control state and the second control state, the output ratio of the motor 81a with respect to the human driving force input to the human-powered vehicle 1 varies in accordance with the predetermined parameter. The output ratio of the motor 81a to the human driving force input to the human-powered vehicle 1 indicates a ratio of the human driving force and the assist force of the human-powered vehicle 1. In the present specification, the output ratio of the motor 81a with respect to the human driving force input to the human-powered vehicle 1 can be described as an output ratio of the motor 81a.

For example, in the first control state and the second control state, the output ratio of the motor 81a varies in accordance with the traveling speed of the human-powered vehicle 1. The motor 81a can output at a maximum ratio set in advance in a case where the traveling speed of the human-powered vehicle 1 is within a predetermined range. In the present specification, a maximum value of the output ratio of the motor 81a is described as a maximum output ratio of the motor 81a. The electronic controller 101 stops the output of the motor 81a in a case where the traveling speed of the human-powered vehicle 1 exceeds the predetermined range.

The electronic controller 101 sets the maximum output ratio of the motor 81a such that the maximum output ratio of the motor 81a becomes a different maximum output ratio in the first control state and the second control state. An example of control executed by the electronic controller 101 will be described with reference to FIG. 10.

Figure 10:
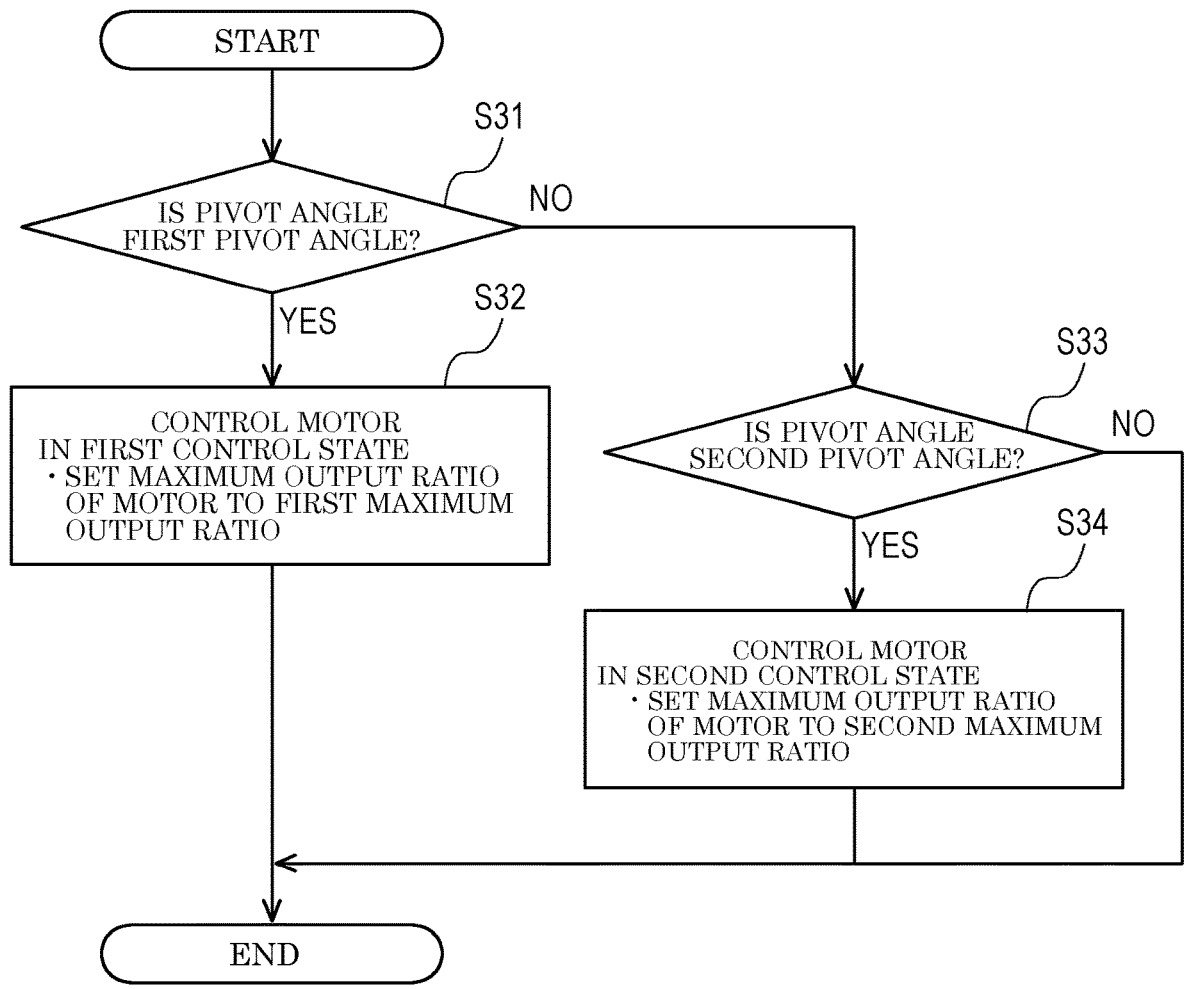
FIG. 10 is a flowchart illustrating a control flow in accordance with a fourth embodiment.

The electronic controller 101 starts a fourth control flow according to a flowchart illustrated in FIG. 10 in a case where a predetermined condition is satisfied. When the fourth control flow ends, the electronic controller 101 repeatedly executes the fourth control flow at predetermined time intervals until the predetermined condition is satisfied. A condition for starting the fourth control flow and a condition for repeating the execution of the fourth control flow are similar to those of the first control flow in the first embodiment.

The electronic controller 101 determines whether the pivot angle D is the first pivot angle in step S31. In a case where the electronic controller 101 determines that the pivot angle D is the first pivot angle, the processing proceeds to step S32. In a case where the electronic controller 101 determines that the pivot angle D is not the first pivot angle, the processing proceeds to step S33.

In step S32, the electronic controller 101 controls the motor 81a in the first control state. The electronic controller 101 sets the maximum output ratio of the motor 81a to the human driving force input to the human-powered vehicle 1 to the first maximum output ratio in the first control state. The storage 102 stores the first maximum output ratio. After performing the processing of step S32, the electronic controller 101 ends the fourth control flow.

The electronic controller 101 determines whether the pivot angle D is the second pivot angle in step S33. In a case where the electronic controller 101 determines that the pivot angle D is the second pivot angle, the processing proceeds to step S34. In a case where determining that the pivot angle D is not the second pivot angle, the electronic controller 101 ends the fourth control flow.

In step S34, the electronic controller 101 controls the motor 81a in the second control state. The electronic controller 101 sets the maximum output ratio of the motor 81a to the human driving force input to the human-powered vehicle 1 to a second maximum output ratio, the second maximum output ratio being greater than the first maximum output ratio in the second control state. The storage 102 stores the second maximum output ratio. After performing the processing of step S34, the electronic controller 101 ends the fourth control flow. In the fourth control flow, in a case where the pivot angle D is not the first pivot angle or the second pivot angle, it is conceivable that the pivot angle D cannot be detected due to, for example, a failure of the sensor 110 and the mounting state of the sensor 110. In a case where determining that the pivot angle D is not the first pivot angle in step S31 and then determining that the pivot angle D is not the second pivot angle in step S33, the electronic controller 101 can perform assist control not based on the pivot angle D.

The electronic controller 101 controls the motor 81a in the first control state in a case where the pivot angle D is the first pivot angle larger than the second pivot angle. In a case where the pivot angle D is the first pivot angle, the electronic controller 101 can perform a suitable control for a case where the swivel state of the carrier C and the riding portion 44 is large by controlling the motor 81a in the first control state. In the present embodiment, the electronic controller 101 can suppress an increase in the traveling speed of the human-powered vehicle 1 in a case where the swivel state of the carrier C and the riding portion 44 is large by setting the maximum output ratio of the motor 81a to the first maximum output ratio smaller than the second maximum output ratio in the first control state. By suppressing an increase in the traveling speed of the human-powered vehicle 1 in a case where the swivel state of the carrier C and the riding portion 44 is large, the human-powered vehicle 1 is easy to maneuver in a small space, and thus the traveling comfort and stability of the human-powered vehicle 1 are improved.

The electronic controller 101 controls the motor 81a in the second control state in a case where the pivot angle D is the second pivot angle smaller than the first pivot angle. In a case where the pivot angle D is the second pivot angle, the electronic controller 101 can perform a suitable control for a case where the swivel state of the carrier C and the riding portion 44 is small by controlling the motor 81a in the second control state. In the present embodiment, the electronic controller 101 can increase the assist force of the human-powered vehicle 1 in a case where the swivel state of the carrier C and the riding portion 44 is small by setting the maximum output ratio of the motor 81a to the second maximum output ratio larger than the first maximum output ratio in the second control state, and thus the traveling comfort and stability of the human-powered vehicle 1 are improved.

Fifth Embodiment

Figure 11:
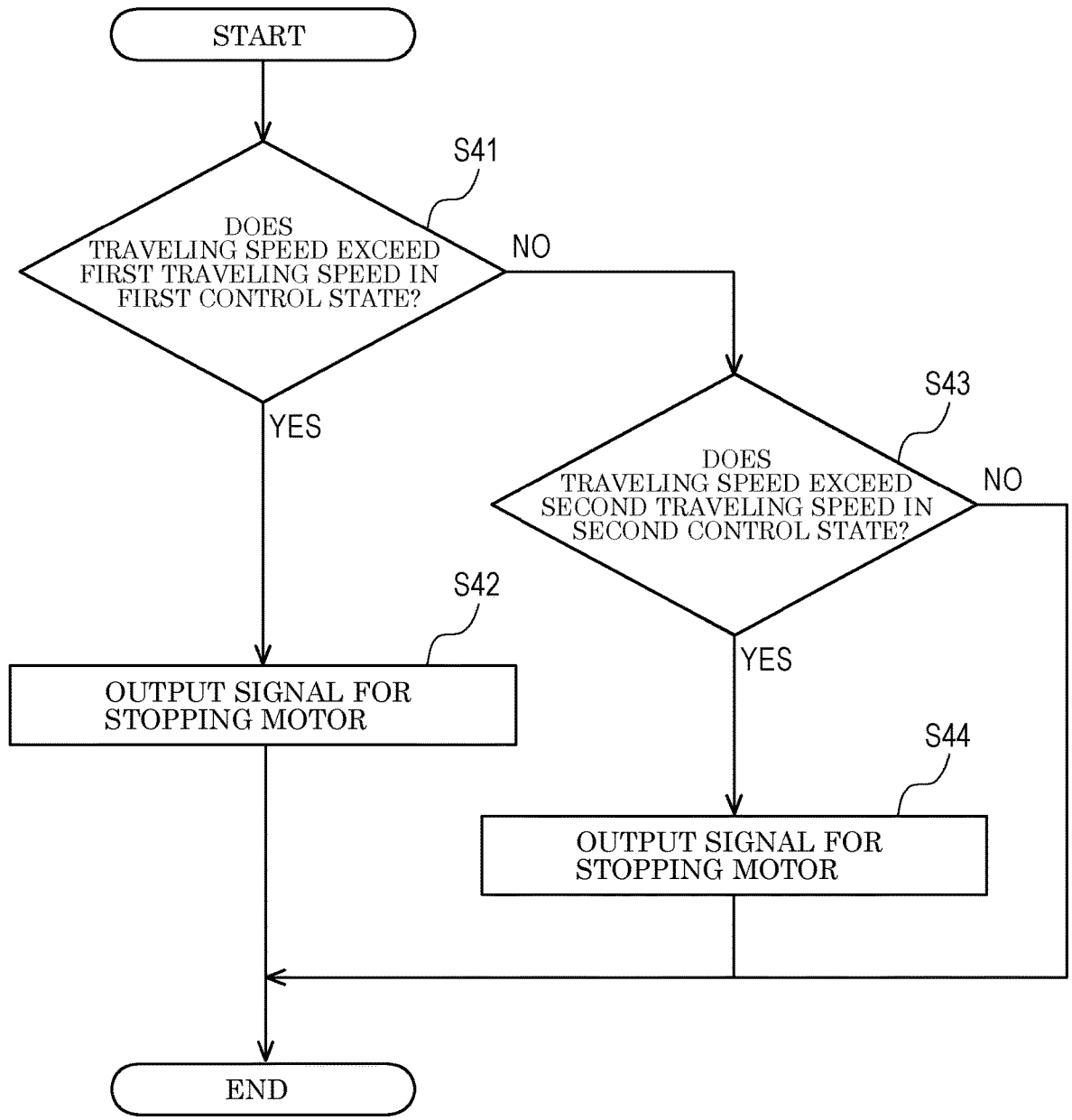
FIG. 11 is a flowchart illustrating a control flow in accordance with a fifth embodiment.

The control system 70 according to a fifth embodiment will be described with reference to FIG. 11. Components common to those of the first to fourth embodiments are denoted by the same reference signs as those of the first to fourth embodiments, and redundant description will be omitted.

The electronic controller 101 is configured to be able to stop the motor 81a. For example, the electronic controller 101 outputs a stop signal for stopping the motor 81a to the motor 81a. The motor 81a stops on the basis of the stop signal output from the electronic controller 101.

The electronic controller 101 is configured to acquire the traveling speed of the human-powered vehicle 1. The traveling speed of the human-powered vehicle 1 is detected by various sensors mounted on the human-powered vehicle 1. The electronic controller 101 can acquire the traveling speed of the human-powered vehicle 1 on the basis of signals output from various sensors.

The storage 102 stores information on the control state of the motor 81a. The information on the control state of the motor 81a includes information indicating whether the current control state of the motor 81a is the first control state or the second control state. The electronic controller 101 can acquire the current control state of the motor 81a by reading information on the control state of the motor 81a from the storage 102.

In the first control state and the second control state, the electronic controller 101 is configured to stops the motor 81a in accordance with the traveling speed of the human-powered vehicle 1. In the present embodiment, the electronic controller 101 is configured to stop the motor 81a in a case where the traveling speed of the human-powered vehicle 1 exceeds a first traveling speed in the first control state.

In the present embodiment, the electronic controller 101 is configured to stop the motor 81a in a case where the traveling speed of the human-powered vehicle 1 exceeds a second traveling speed in the second control state, the second traveling speed being greater than the first traveling speed.

An example of control executed by the electronic controller 101 will be described with reference to FIG. 11. The electronic controller 101 starts a fifth control flow according to a flowchart illustrated in FIG. 11 in a case where a predetermined condition is satisfied. When the fifth control flow ends, the electronic controller 101 repeatedly executes the fifth control flow at predetermined time intervals until the predetermined condition is satisfied. A condition for starting the fifth control flow and a condition for repeating the execution of the fifth control flow are similar to those of the first control flow in the first embodiment.

In step S41, the electronic controller 101 acquires the traveling speed of the human-powered vehicle 1 on the basis of signals output from various sensors. The electronic controller 101 compares the information stored in the storage 102 with the traveling speed of the human-powered vehicle 1 to control the motor 81a. The storage 102 stores information on the first traveling speed and the second traveling speed related to the traveling speed of the human-powered vehicle 1. The electronic controller 101 determines whether the traveling speed of the human-powered vehicle 1 exceeds the first traveling speed while controlling the motor 81a in the first control state. In a case where the traveling speed of the human-powered vehicle 1 exceeds the first traveling speed, the electronic controller 101 controls the motor 81a to stop the output of the motor 81a. In a case where the electronic controller 101 determines that the traveling speed of the human-powered vehicle 1 exceeds the first traveling speed in the first control state, the processing proceeds to step S42. In a case where the electronic controller 101 determines that the traveling speed of the human-powered vehicle 1 does not exceed the first traveling speed in the first control state, the processing proceeds to step S43.

In step S42, the electronic controller 101 outputs a stop signal for stopping the motor 81a to the motor 81a. After performing the processing of step S42, the electronic controller 101 ends the fifth control flow.

In step S43, the electronic controller 101 determines whether the traveling speed of the human-powered vehicle 1 exceeds the second traveling speed while controlling the motor 81a in the second control state. In a case where the traveling speed of the human-powered vehicle 1 exceeds the second traveling speed, the electronic controller 101 controls the motor 81a to stop the output of the motor 81a. In a case where the electronic controller 101 determines that the traveling speed of the human-powered vehicle 1 exceeds the second traveling speed in the second control state, the processing proceeds to step S44. In a case where determining that the traveling speed of the human-powered vehicle 1 does not exceed the second traveling speed in the second control state, the electronic controller 101 ends the fifth control flow.

In step S44, the electronic controller 101 outputs a stop signal for stopping the motor 81a to the motor 81a. After performing the processing of step S44, the electronic controller 101 ends the fifth control flow.

The electronic controller 101 can control the motor 81a in a suitable manner for a case where the swivel state of the carrier C and the riding portion 44 is large by executing the processing of step S42 in the fifth control flow. In the present embodiment, the electronic controller 101 controls the motor 81a in the first control state in a case where the pivot angle D is the first pivot angle smaller than the second pivot angle. The electronic controller 101 is configured to stop the motor 81a in a case where the traveling speed of the human-powered vehicle 1 exceeds the first traveling speed in the first control state. Since the first traveling speed is less than the second traveling speed, the electronic controller 101 can advance a stop timing of the assist of the human-powered vehicle 1 accompanying the increase in the traveling speed of the human-powered vehicle 1, for example, in a case where the swivel state of the carrier C and the riding portion 44 is large. By advancing the stop timing of the assist of the human-powered vehicle 1 in a case where the swivel state of the carrier C and the riding portion 44 is large, the human-powered vehicle 1 is easy to maneuver in a small space, and thus the traveling comfort and stability of the human-powered vehicle 1 are improved.

The electronic controller 101 can control the motor 81a in a suitable manner for a case where the swivel state of the carrier C and the riding portion 44 is small by executing the processing of step S44 in the fifth control flow. In the present embodiment, the electronic controller 101 controls the motor 81a in the second control state in a case where the pivot angle D is the second pivot angle smaller than the first pivot angle. The electronic controller 101 is configured to stop the motor 81a in a case where the traveling speed of the human-powered vehicle 1 exceed the second traveling speed in the second control state. Since the second traveling speed is greater than the first traveling speed, the electronic controller 101 can easily assist continuously by the human-powered vehicle 1 in a case where the swivel state of the carrier C and the riding portion 44 is small, and thus the traveling comfort and stability of the human-powered vehicle 1 are improved.

Modifications

The description about each embodiment exemplifies possible forms that can be taken by the control system 70 and the control device 100 according to the present invention, and is not intended to limit the present invention. The control system 70 and the control device 100 according to the present invention can take a form in which, for example, the following modifications of the embodiments and at least two modifications that do not contradict each other are combined.

For example, the configuration of the human-powered vehicle 1 according to each embodiment is an example. The human-powered vehicle 1 can include various devices not illustrated in each embodiment, and do not have to include some of the various devices illustrated in each embodiment.

Figure 12:
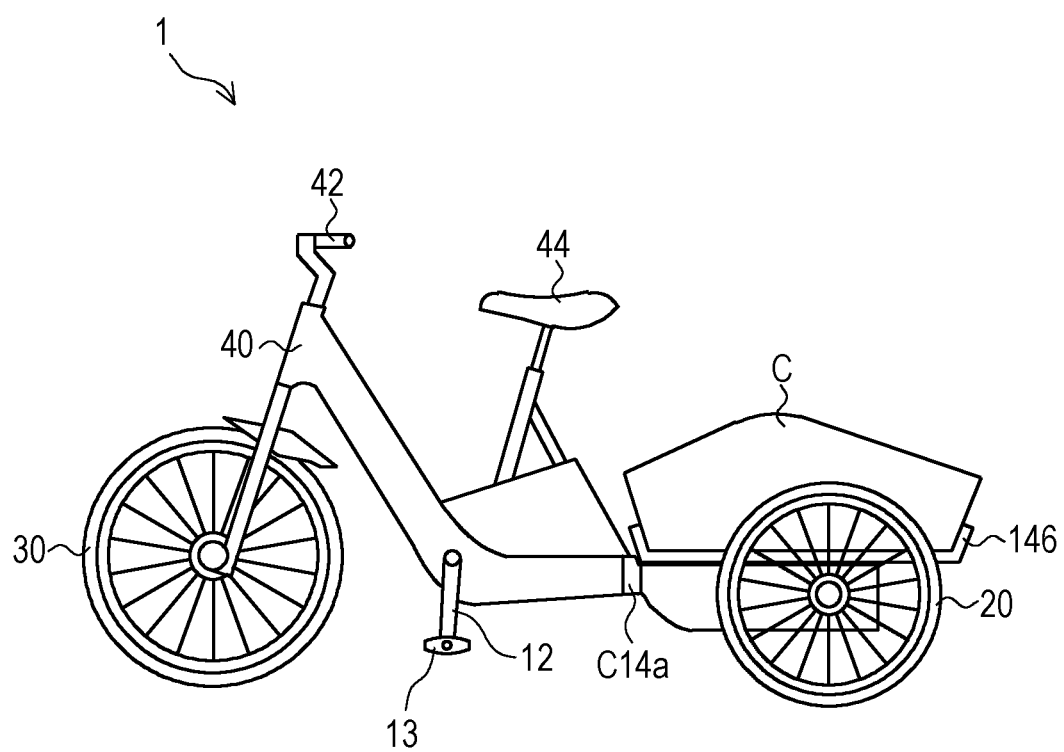
FIG. 12 is a side elevational view illustrating a modification of the human-powered vehicle.

FIG. 12 illustrates a modification of the human-powered vehicle 1. In FIG. 12, the human-powered vehicle 1 is schematically illustrated, and description of some devices and mechanisms of the human-powered vehicle 1 is omitted. In FIG. 12, for example, the description of a braking device, the drive mechanism 50, and the like is omitted.

The carrier C illustrated in FIG. 12 is supported by a support 146. The rear wheel 20, the support 146, and the carrier C are coupled to the frame 40 via the pivot portion C14a to rotate relative to the frame 40 in a rolling direction. The pivot angle D in the modification is a relative rotation angle in the rolling direction of the carrier C with respect to the riding portion 44. The pivot angle D in the modification can be a relative rotation angle in the rolling direction of the riding portion 44 with respect to the carrier C. The electronic controller 101 executes the control flow in each embodiment to change the control state of the motor 81a and the like, and thus can control the drive unit 81 on the basis of the pivot angle D in the modification.

The configurations exemplified in each embodiment can be combined with each other within a range not contradictory to each other. The processing contents and the processing order of the flowcharts exemplified in each embodiment are merely examples, and the processing contents and the processing order can be appropriately changed within the scope of the present invention.

Various thresholds used in the control exemplified in each embodiment are not limited, and can be arbitrarily set. Various thresholds can be arbitrarily changed by an operation of the operation device 43 or the like.

The electrical component 80 controlled by the electronic controller 101 in each embodiment is not limited to the drive unit 81. In each embodiment, the electronic controller 101 can control the electrical component 80 different from the drive unit 81. In each embodiment, the electronic controller 101 can control, for example, at least one of the electric suspension 82, the electric seatpost 83, the electric rear derailleur 84, the electric front derailleur 85, the electric clutch 86, the electronic terminal 87, the display 88, the vibration generator 89, the light generator 90, and the sound generator 91.

For example, in a case where controlling the electric suspension 82 in each embodiment, the electronic controller 101 changes various parameters of the electric suspension 82 in accordance with the pivot angle D, the control state of the motor 81a, and the traveling speed of the human-powered vehicle 1. The various parameters of the electric suspension 82 include, for example, at least one of a lockout state, a travel amount, a damping force, or a repulsive force.

For example, in a case where controlling the electric seatpost 83 in each embodiment, the electronic controller 101 changes various parameters of the electric seatpost 83 in accordance with the pivot angle D, the control state of the motor 81a, and the traveling speed of the human-powered vehicle 1. The various parameters of the electric seatpost 83 include, for example, the height of the riding portion 44.

For example, in a case where controlling the electric rear derailleur 84 in each embodiment, the electronic controller 101 changes various parameters of the electric rear derailleur 84 in accordance with the pivot angle D, the control state of the motor 81a, and the traveling speed of the human-powered vehicle 1. The various parameters of the electric rear derailleur 84 include, for example, a transmission stage.

For example, in a case where controlling the electric front derailleur 85 in each embodiment, the electronic controller 101 changes various parameters of the electric front derailleur 85 in accordance with the pivot angle D, the control state of the motor 81a, and the traveling speed of the human-powered vehicle 1. The various parameters of the electric front derailleur 85 include, for example, a transmission stage.

For example, in a case where controlling the electric clutch 86 in each embodiment, the electronic controller 101 switches the transmission state of the electric clutch 86 to one of the first transmission state or the second transmission state to the other one of the first transmission state or the second transmission state in accordance with the pivot angle D, the control state of the motor 81a, and the traveling speed of the human-powered vehicle 1.

For example, in a case where controlling the electronic terminal 87 in each embodiment, the electronic controller 101 causes the electronic terminal 87 to perform a predetermined notification operation in accordance with the pivot angle D, the control state of the motor 81a, and the traveling speed of the human-powered vehicle 1. The predetermined notification operation to be performed by the electronic terminal 87 includes at least one of an operation of displaying a predetermined message, an operation of generating predetermined vibration, an operation of outputting predetermined light, or an operation of outputting predetermined sound.

For example, in a case where controlling the display 88 in each embodiment, the electronic controller 101 causes the display 88 to perform a predetermined notification operation in accordance with the pivot angle D, the control state of the motor 81a, and the traveling speed of the human-powered vehicle 1. The predetermined notification operation to be performed by the display 88 includes the operation of displaying a predetermined message.

For example, in a case where controlling the vibration generator 89 in each embodiment, the electronic controller 101 causes the vibration generator 89 to perform a predetermined notification operation in accordance with the pivot angle D, the control state of the motor 81a, and the traveling speed of the human-powered vehicle 1. The predetermined notification operation to be performed by the vibration generator 89 includes the operation of generating predetermined vibration.

For example, in a case where controlling the light generator 90 in each embodiment, the electronic controller 101 causes the light generator 90 to perform a predetermined notification operation in accordance with the pivot angle D, the control state of the motor 81a, and the traveling speed of the human-powered vehicle 1. The predetermined notification operation to be performed by the light generator 90 includes the operation of generating predetermined light.

For example, in a case where controlling the sound generator 91 in each embodiment, the electronic controller 101 causes the sound generator 91 to perform a predetermined notification operation in accordance with the pivot angle D, the control state of the motor 81a, and the traveling speed of the human-powered vehicle 1. The predetermined notification operation to be performed by the sound generator 91 includes the operation of generating predetermined sound.

The expression "at least one" as used herein means "one or more" of the desired options. As an example, the expression "at least one" as used herein means "only one option" or "both of two options" if the number of options is two. As another example, the expression "at least one" as used herein means "only one option" or "a combination of two or more arbitrary options" if the number of options is three or more.

What is claimed is:

1. A control system for a human-powered vehicle, the control system comprising:
   a sensor configured to output a signal corresponding to a pivot angle of a pivot portion provided between a riding portion and a carrier, the riding portion being located between the carrier and a handle;
   a drive unit including a motor configured to apply a propulsive force to the human-powered vehicle; and
   an electronic controller configured to control the motor in accordance with the signal output from the sensor in a first control state where the pivot angle is a first pivot angle and in a second control state different from the first control state where the pivot angle is a second pivot angle smaller than the first pivot angle.

2. The control system according to claim 1, wherein the electronic controller is configured to set a maximum output value of the motor to a first output value in the first control state.

3. The control system according to claim 2, wherein the electronic controller is configured to set the maximum output value of the motor to a second output value in the second control state, the second output value is larger than the first output value.

4. The control system according to claim 3, wherein the electronic controller is configured to set a response speed of the motor into a first response speed where output of the motor increases in the first control state.

5. The control system according to claim 4, wherein the electronic controller is configured to set the response speed of the motor into a second response speed where the output of the motor increases in the second control state, the second response speed being higher than the first response speed.

6. The control system according to claim 1, wherein the electronic controller is configured to set a maximum output ratio of the motor to a human driving force input to the human-powered vehicle to a first maximum output ratio in the first control state.

7. The control system according to claim 6, wherein the electronic controller is configured to set the maximum output ratio of the motor to the human driving force input to the human-powered vehicle to a second maximum output ratio, the second maximum output ratio is greater than the first maximum output ratio in the second control state.

8. The control system according to claim 1, wherein the electronic controller is configured to stop the motor in a case where a traveling speed of the human-powered vehicle exceeds a first traveling speed in the first control state.

9. The control system according to claim 8, wherein the electronic controller is configured to stop the motor in a case where the traveling speed of the human-powered vehicle exceeds a second traveling speed in the second control state, the second traveling speed is greater than the first traveling speed.

10. The control system according to claim 1, wherein the electronic controller is configured to control an additional electrical component in accordance with the signal output from the sensor, the additional electrical component including at least one of an electric suspension, an electric seatpost, an electric rear derailleur, an electric front derailleur, an electric clutch, an electronic terminal, a display, a vibration generator, a light generator, or a sound generator.

11. A control device for a human-powered vehicle, the control device comprising:
an electronic controller configured to control a motor configured to apply a propulsive force to the human-powered vehicle in accordance with a pivot state detected by a sensor configured to output a signal corresponding to a pivot angle of a pivot portion provided between a riding portion and a carrier, the riding portion being located between the carrier and a handle, the electronic controller configured to control the motor in a first control state where the pivot angle is a first pivot angle and in a second control state different from the first control state where the pivot angle is a second pivot angle smaller than the first pivot angle.

12. The control device according to claim 11, wherein the electronic controller is configured to set a maximum output value of the motor to a first output value in the first control state.

13. The control device according to claim 12, wherein the electronic controller is configured to set the maximum output value of the motor to a second output value in the second control state, the second output value is larger than the first output value.

14. The control device according to claim 13, wherein the electronic controller is configured to set a response speed of the motor into a first response speed where output of the motor increases in the first control state.

15. The control device according to claim 14, wherein the electronic controller is configured to set the response speed of the motor into a second response speed where the output of the motor increases in the second control state, the second response speed being higher than the first response speed.

16. The control device according to claim 11, wherein the electronic controller is configured to set a maximum output ratio of the motor to a human driving force input to the human-powered vehicle to a first maximum output ratio in the first control state.

17. The control device according to claim 16, wherein the electronic controller is configured to set the maximum output ratio of the motor to the human driving force input to the human-powered vehicle to a second maximum output ratio, the second maximum output ratio is greater than the first maximum output ratio in the second control state.

18. The control device according to claim 11, wherein the electronic controller is configured to stop the motor in a case where a traveling speed of the human-powered vehicle exceeds a first traveling speed in the first control state.

19. The control device according to claim 18, wherein the electronic controller is configured to stop the motor in a case where the traveling speed of the human-powered vehicle exceeds a second traveling speed in the second control state, the second traveling speed is greater than the first traveling speed.

20. The control device according to claim 11, wherein the electronic controller is configured to control an additional electrical component in accordance with the signal output from the sensor, the additional electrical component including at least one of an electric suspension, an electric seatpost, an electric rear derailleur, an electric front derailleur, an electric clutch, an electronic terminal, a display, a vibration generator, a light generator, or a sound generator.

* * * * *